United States Patent [19]

Pruvot et al.

[11] Patent Number: 4,791,841
[45] Date of Patent: Dec. 20, 1988

[54] CHUCKING DEVICE

[75] Inventors: Francois C. Pruvot, La Conversion; Laurent R. Coste; Alain G. Rebetez, both of Moutier, Switzerland

[73] Assignee: Tornos-Bechler SA, Fabrique de Machines Moutier, Moutier, Switzerland

[21] Appl. No.: 897,090

[22] Filed: Aug. 18, 1986

[30] Foreign Application Priority Data

Aug. 19, 1985 [CH] Switzerland ............... 3555/85

[51] Int. Cl.$^4$ .................. B23B 19/02; B23B 31/30
[52] U.S. Cl. ........................... 82/30; 82/40 R; 279/4
[58] Field of Search ............ 279/4, 111; 269/28, 269/33; 29/38 A, 38 B; 82/40 R, 30, 3

[56] References Cited

U.S. PATENT DOCUMENTS

| 2,833,543 | 5/1958 | Main ............................ 279/4 |
| 3,625,530 | 12/1971 | Parsons ........................ 279/4 |
| 3,643,969 | 2/1972 | Finley et al. ................. 279/4 |
| 3,835,649 | 9/1974 | Le Testu ...................... 279/4 X |
| 4,615,101 | 10/1986 | Edwards et al. .............. 279/4 |

FOREIGN PATENT DOCUMENTS

| 40697 | 12/1981 | European Pat. Off. ........... 279/4 |
| 2379351 | 9/1978 | Fed. Rep. of Germany ......... 279/4 |
| 563828 | 7/1975 | Switzerland . |

Primary Examiner—Z. R. Bilinsky
Attorney, Agent, or Firm—Parkhurst, Oliff & Berridge

[57] ABSTRACT

A primary piston (19) slides axially on a spindle body (5). Together with two cylindrical bearing surfaces of different diameters (D1 and D2) of the spindle body, the primary piston bounds a primary hydraulic chamber 22) which communicates via a conduit (25) with a secondary hydraulic chamber (24). The active face (33) of a secondary piston (20) bounds the secondary hydraulic chamber (24), so that the secondary piston (20) is displaced in response to a displacement of the primary piston (19) which is reduced in the same ratio as the cross-sections of the two chambers. The secondary piston (20) acts upon a chucking sleeve (15) which actuates the chuck (12) against the bias of a spring member (17) which, in the absence of pressure, holds the chuck (12) grippingly on a workpiece. The primary piston (19) is controlled by compressed air fed through a fixed spindle support (1) via a conduit (27) into a pneumatic chamber (21) bounded by a fixed bore (8) and by two disk-shaped elements (7 and 19) rotating with the spindle.

6 Claims, 2 Drawing Sheets

CHUCKING DEVICE

BACKGROUND AND SUMMARY OF THE INVENTION

This invention relates to machine tools, and more particularly to a device for chucking in a machine-tool spindle a workpiece or a bar of material to be machined, of the type having a chuck and a socket for gripping the chuck, these elements being associated with a spindle body driven rotatingly.

Present-day automatic lathes operate at spindle speed of several thousand revolutions per minute. Moreover, in view of the material-removing capacity of modern tools, the power brought into play during machining attain much greater values than in the past. As a result, the torque which must be transmitted to the bar by the chuck gripping it in the spindle is so great that earlier chucking means, especially those of the mechanical type actuated by a cylinder cam, can no longer be used. One of the shortcomings of these previous systems is that the chucking force must be transmitted via ball bearings; and owing to the requirements mentioned above in connection with the power to be transmitted, this presents difficulties in modern machines.

It has already been proposed to use a mixed pneumatic-hydraulic transmission to grip a chuck of a workpiece holder in a machine tool (Swiss Pat. No. 563,828). A large-diameter primary piston actuated by compressed air has a small-diameter extension which acts in a hydraulic chamber, a secondary part of which is bounded by a secondary piston which is thus subjected to a multiplied force. The contemplated arrangement comprises a compressed-air control of chucking and dechucking, which can require relatively high air pressures. Furthermore, a way in which this prior art system could be applied to a rotary work spindle, especially a spindle rotating at high speed, is not disclosed in this specification.

U.S. Pat. No. 3,643,969 teaches, for a lathe spindle, a collet operated by means of a plunger displaced axially by compressed-air pressure against the bias of a gripping spring. As the control sleeve of the collet rotates with spindle, whereas the plunger moves only axially, the operation involves friction between rotating surfaces and fixed surfaces, and this is incompatible with the maximum speeds of present-day lathes.

It is therefore an object of this invention to provide an improved chucking device which is adapted to the requirements of modern automatic lathes.

To this end, the chucking device according to the present invention, of the type initially mentioned, further comprises, associated with the spindle body, a primary piston actuated pneumatically, a secondary piston actuated by displacement of a hydraulic volume, and a chucking spring, the secondary piston acting against the bias of the spring with multiplication of the force and reduction of the path owing to the action of the primary piston, and the latter being controlled from a fixed source through a passage having gauged clearance.

BRIEF DESCRIPTION OF THE DRAWINGS

Two preferred embodiments of the invention will now be described in detail with reference to the accompanying drawings, in which.

DETAILED DESCRIPTION OF THE PREFERRED EMBODIMENTS

Figure 1:
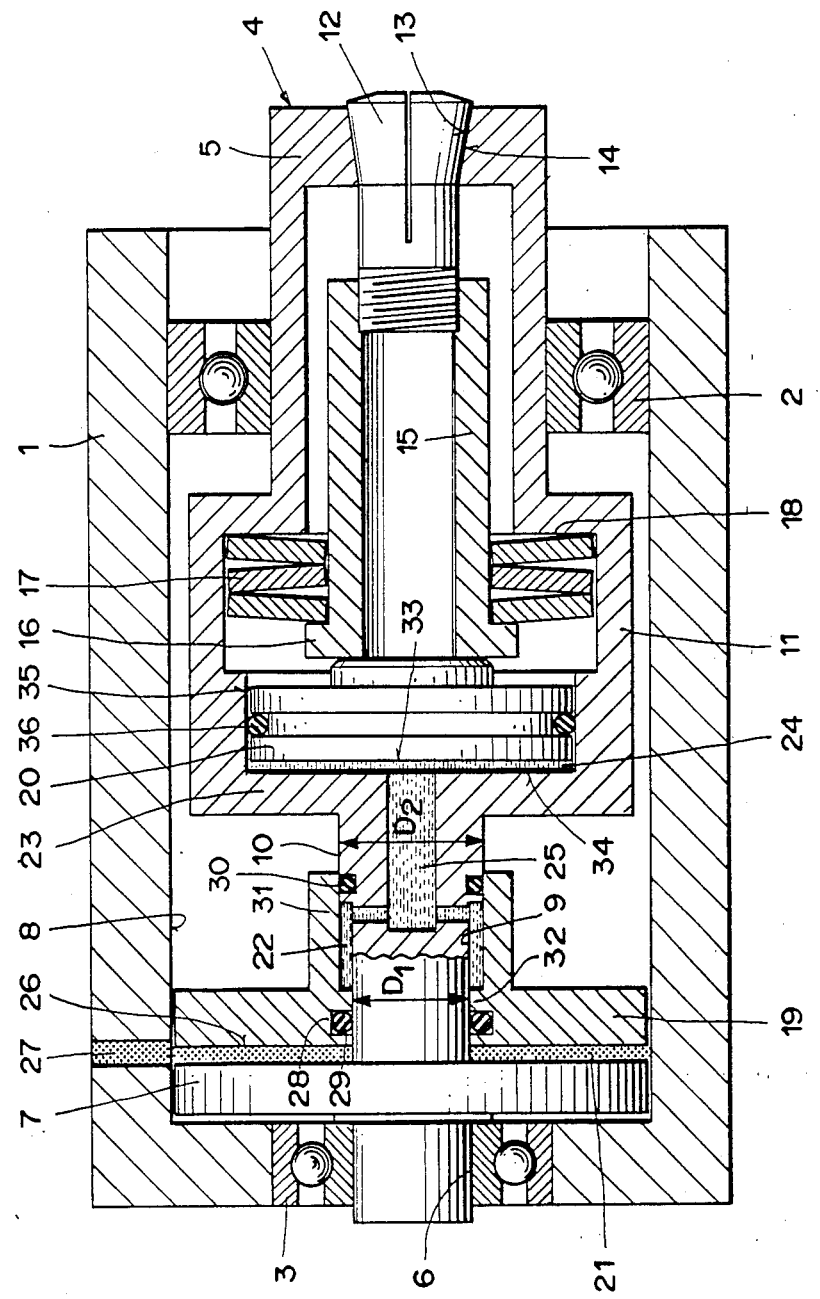
FIG. 1 is a diagrammatic sectional view of the first embodiment.

FIG. 1 shows diagrammatically and partially a workpiece holder in a multiple-spindle lathe. A spindle support 1 is depicted in the form of a cylindrical part supporting two ball bearings 2 and 3 at each end. These bearings guide the spindle, designated as a whole by reference numeral 4, the main part of which is a spindle body 5. At the rear, spindle body 5 includes a cylindrical bearing surface 6 fitted in the inner race of bearing 3. Although not shown in the drawing, spindle 4 continues toward the rear either to a pulley or to a gear rim or coupling connecting it to the shaft of a motor so that it can be driven rotatingly. In front of bearing 3, spindle body 5 comprises a disk-shaped part 7 fitted with a predetermined clearance into a bore 8 within spindle support 1. The clearance between bore 8 and the periphery of part 7 will be determined by conditions to be stipulated below.

In front of part 7, spindle body 5 has a cylindrical portion with a first cylindrical segment 9 having a first diameter D1, followed by a second cylindrical segment 10 coaxial with segment 9 and having a bearing surface machined with a second diameter D2 greater than D1. As will be seen below, diameters D1 and D2 play an essential part in the operation of the device. In front of cylindrical portion 9/10, spindle body 5 includes a part 11 in the form of a cylinder containing a chuck 12 and the elements necessary for operating it. Chuck 12 comprises, in manner known per se, jaws separated from one another by slits and bounded outwardly by conical surface portions 13 facing a matching conical surface 14 in the end of spindle body 5. The rearward end of chuck 12 is screwed to a cylindrical operating sleeve 15 which in turn has a collar 16 at the rear. A resilient member 17, made up of a series of cup springs, is accommodated between collar 16 and an inner annular shoulder 18 of spindle body 5. Resilient member 17 is mounted with a certain pre-tensioning so that it presses outer surfaces 13 of chuck 12 against conical inner surfaces 14 at the mouth of spindle body 5. Chuck 12 is thus compressed radially against a workpiece or section of bar stock inserted in spindle body 5. It is axially movable relative to section 11 of spindle body 5, the front part 14 of which acts as a chucking socket while remaining fixed.

The hydropneumatic device which makes possible the programmed control of the opening and closing of chuck 12 acts against the bias of spring 17 on chuck 12 itself. This device comprises a primary piston 19 and a secondary piston 20. Primary piston 19, disk-shaped part 7 of spindle body 5, and bore 8 of spindle support 1 together bound a pneumatic chamber 21. A primary hydraulic chamber 22 is bounded by a prolongation 31 of primary piston 19 together with the two cylindrical bearing surfaces 9 and 10, whereas a secondary hydraulic chamber 24 is bounded by secondary piston 20 together with a disk-shaped wall 23 of part 11. Chambers 22 and 24 communicate through a duct 25 inside spindle body 5. More precisely, it will be seen that primary piston 19 has an annular active face 26 facing part 7 of spindle body 5 and bounding pneumatic chamber 21. Compressed air can be fed to chamber 21 through one or more boreholes 27 passing through the cylindrical part of spindle support 1 and opening into bore 8. As spindle support 1 is fixed, the aforementioned clearance between parts 19 or 7 and bore 8 must be large enough to prevent any accidental contact but small enough to prevent any significant leakage of compressed air at the time of actuation. Primary piston 19 includes an inner groove 28 containing a sealing ring 29 which makes hydraulic chamber 22 tight against any leakage in the joint between primary piston 19 and cylindrical bearing surface 9 of spindle body 5. A second gasket 30 is provided in cylindrical bearing surface 10 of spindle body 5. Gaskets 29 and 30 ensure the fluid-tightness of hydraulic chamber 22. Chamber 22 is bounded by a bore 31 in primary piston 19 which is fitted to diameter D2, by cylindrical bearing surface 9 fitted to diameter D1, and by a bore 32 in primary piston 19 which is likewise fitted to diameter D1. In sliding axially on the cylindrical bearing surfaces 9 and 10, primary piston 19 increases or decreases the volume of chamber 22. The variation in volume as a function of the distance travelled may be selected at will since it depends only on the difference between diameters D1 and D2.

Secondary hydraulic chamber 24 is bounded on one side by an active face 33 of secondary piston 20 and on the other side by a flat, disk-shaped face 34 on the inside of spindle body 5. Face 34 is directly opposite active face 33 and has the same diameter. It will be seen that secondary piston 20 slides axially in a bore 35 in spindle body 5, secondary chamber 24 being made fluid-tight by a gasket 36 seated in an annular groove.

Finally, since the center part of secondary piston 20 rests against the rearward end of gripping sleeve 15, the axial movements of the former are directly transmitted by contact to sleeve 15 and to chuck 12.

The chucking operation comprises the supplying of compressed air at sufficiently high pressure to pneumatic chamber 21 through conduits 27. The air pressure acting between part 7 of spindle body 5 and active face 26 of primary piston 19 causes this piston to move to the right, as viewed in the drawing, thus gradually reducing the volume of primary hydraulic chamber 22. Oil contained in this chamber is forced through conduit 25 and reaches hydraulic chamber 24. It will be noted that inasmuch as the amount of energy required for the compressed air to move primary piston 19 is equal to that which moves secondary piston 20, and inasmuch as the volume of oil exhausted from chamber 22 is equal to the amount entering chamber 24, the reduction of the path of secondary piston 20 relative to that of primary piston 19 will be inversely proportional to the ratio of the cross-sections of hydraulic chambers 24 and 22. On the other hand, inasmuch as the pressures are equal throughout the hydraulic system, the force with which secondary piston 20 acts upon resilient member 17 in order to compress it and thus move the chuck 12 is a multiple of the force opposing the movement of primary piston 19.

With the arrangement described above, a considerable multiplication of the force transmitted to secondary piston 20 can be obtained. The air pressure acting upon primary piston 19 can be relatively low. As a result, the air loss in volume and in pressure through the gauged clearance provided for between parts 1, 7, and 19 remains slight. Pneumatic control of the system through spindle support 1 is easily possible without excessive loss of compressed air.

Figure 2:
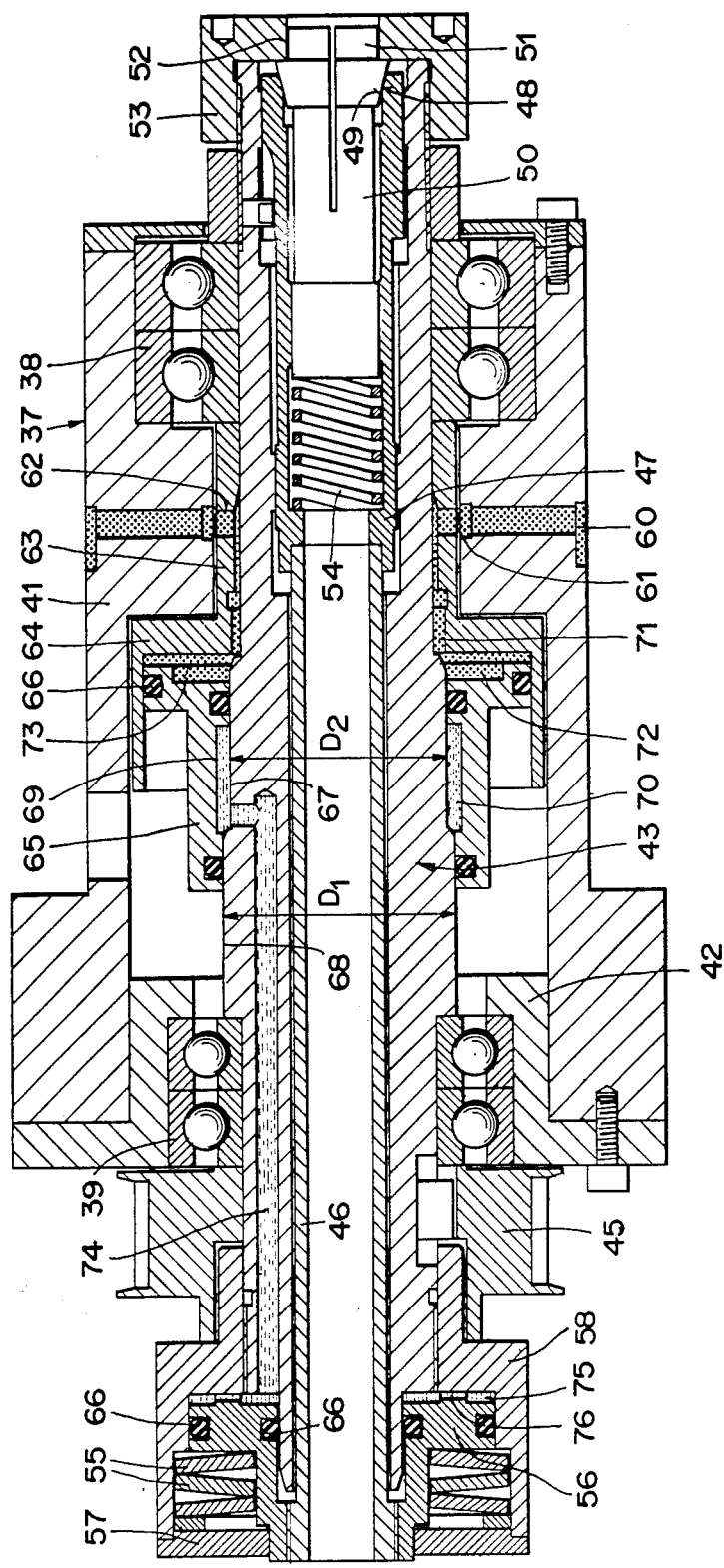
FIG. 2 is a slightly simplified sectional view of the second embodiment.

FIG. 2 shows an embodiment of the invention as applied to the headstock of an automatic lathe intended for machining a series of parts from one bar of material inserted at the back of the headstock. A headstock frame 37 serves as a spindle support. It is an assembly of several components supporting two pairs of ball bearings 38 and 39 corresponding to bearings 2 and 3 of the first embodiment. A spindle body 43 is rotatingly supported by bearings 38 and 39. Mounted within spindle body 43 is a tubular part 46 constituting a force-transmission component, to the front end of which the chucking socket proper 47 is fixed. At the front end of the latter, in turn, is a conical gripping surface 48 which cooperates with outer conical surfaces 49 of a chuck 50. In front of surfaces 49, chuck 50 includes a cylindrical bearing surface 51 fitted in an aperture 52 of a tip-piece 53 fixed to spindle body 43. A spring 54 urges chuck 50 away from chucking socket 47, while transmission tube 46 and chucking socket 47 are in turn biased toward the front by a resilient member 55 consisting, as in the first embodiment, of a set of cup springs. These springs are compressed with suitable pre-tensioning between a disk-shaped portion of a secondary piston 56 and an annular wall 57 integral with a cylindrical part 58 which is screwed on the rearward end of spindle body 43. A cylindrical prolongation at the back of secondary piston 56 is screwed on the threaded rearward end of tube 46 and may be fixed thereon by means not shown. Thus, inasmuch as cylinder 57, 58 is integral with spindle body 43, resilient member 55 presses secondary piston 56 toward the front and, as a result, constantly urges parts 46 and 47 forward. Chuck 50 being held by its front shoulder within the tip-piece 53, which is in turn screwed to spindle body 43, it will be clear that spring elements 55 have the tendency to press inner surfaces 48 of chucking socket 47 against the conical outer surfaces 49 of the jaws of chuck 50, thus causing chuck 50 to close on a bar inserted in tube 46 and chuck 50.

The hydropneumatic device controlling the opening and closing of chuck 50 is slightly different from that described with reference to FIG. 1. It comprises a compressed-air feed in the form of conduits 60 passing radially through fixed cylindrical part 41 of headstock 37. Conduits 60 open at their inner ends into a circular groove 61 which faces a series of holes 62 distributed around and passing through a sleeve 63 fitted on spindle body 43 and integral therewith. Sleeve 63 continues at the rear into a cylinder 64 which bounds a pneumatic chamber and surrounds a primary piston 65 capable of sliding axially between spindle body 43 and the wall of cylinder 64. This piston includes a prolongation fitted over the outer surface of spindle body 43. Gaskets 66 are provided at both ends of the prolongation of primary piston 65 between the inner faces of this piston and the outer surface of spindle body 43, as wells as between the outer face of primary piston 65 and the inside surface of cylinder 64.

Here, too, the multiplication of forces due to the hydraulic transmission is brought about by providing on spindle body 43, facing primary piston 65, two cylindrical bearing surfaces 67 and 68 offset axially and having diameters D1 and D2 respectively, diameter D2 being slightly greater than diameter D1. Moreover, primary piston 65 straddles cylindrical bearing surfaces 67 and 68 and therefore has a difference in bore between its front and back ends corresponding to the difference between diameters D2 and D1. Provided in the central part of primary piston 65 is a cylindrical recess 69. Primary piston 65 is actuated by the compressed air arriving through conduits 60, passing through holes 62 in sleeve 63, the outside diameter of which is fitted to the bore diameter of part 41 in order to obtain a gauged clearance, similarly to the clearance provided between bore 8 and primary piston 19 in the first embodiment. In this case, however, inasmuch as the diameter of sleeve 63 is smaller than that of primary piston 65, the leakage of compressed air will be even easier to check. This air then passes into an annular duct 71 between spindle body 43 and sleeve 63 to reach a pneumatic chamber 72 bounded between the axial inside surface of cylinder 64 and the active face 73 of primary piston 65.

A primary hydraulic chamber 70 communicates via duct 74 in the wall of spindle body 43 with a secondary hydraulic chamber 75 bounded between the axial surface of cylinder 58 and the active face 76 of secondary piston 56.

Except for the compressed-air feed taking place through an annular clearance of small diameter by the rotary coupling produced between inner groove 61 of spindle 41 and holes 62 made radially in sleeve 63, which rotates with the spindle, this control device operates the same way as the device of FIG. 1. When primary piston 65 is moved by air pressure exerted on face 73, the volume of primary hydraulic chamber 70 varies, so that a certain mass of oil is displaced from primary chamber 70 to secondary chamber 75 or vice versa. As the cross-section of chamber 75 is a multiple of that of chamber 70, the path of secondary piston 56 is reduced in the same proportion relative to the path of primary piston 65. On the other hand, as the oil pressure is the same in both chambers, the force exerted by secondary piston 56 on the stack of cup springs 55 is multiplied relative to the force exerted on primary piston 65. In this way, with fairly low air pressure and, consequently, relatively low loss of air as well, chuck 50 can be opened or closed gradually and smoothly simply by regulating the supply of compressed air to conduits 60. This air feed may be controlled by programmable electronic means so that the commands to open and close the chuck may easily be incorporated in a numeric control program of the automatic lathe. Moreover, as the forces brought into play are exerted solely between the parts which rotate with the spindle, it will be realized that the action of these forces cannot bring about any reaction on bearings 38 and 39, nor can they cause any vibration or excessive stress on any component. Inasmuch as the air pressure is transmitted from the fixed headstock 37 to the rotary spindle through the cylindrical clearance between groove 61 and the cylindrical outer surface of sleeve 63 into which holes 62 open out, this transmission of air takes place without there being any reaction axially. The structural conditions are thus favorable.

Furthermore, it will be noted that oil leakage is likewise reduced to a minimum owing to gaskets 66 at all the locations where leakage might occur. Any leak in the hydraulic system is automatically compensated for by an advance of the primary piston, so that the pressures are maintained.

The chucking device according to the present invention can be used in various ways. Thus, the basic arrangement described with reference to FIG. 1 might be applied to multiple-spindle lathes, for example, with separate workpieces being inserted from the front into the chuck upon each change of workpiece. The embodiment illustrated in FIG. 2 preferably relates to automatic lathes machining bar stock.

What is claimed is:

1. A device for chucking a workpiece or a bar of material in a machine-tool, comprising:
   a support frame;
   a spindle arrangement rotatably mounted within said frame about an axis; and
   control means on said frame for controlling said chucking;
   wherein said spindle arrangement comprises:
      a spindle body rotatably supported about said axis within said frame;
      a chuck member and a socket member coaxially mounted within said body for relative displacement along said axis between an open position and a closed position;
      a chucking spring urging said chuck and socket members towards the closed position; and
      a hydropneumatic driving means selectively activated for urging said chuck and socket members towards the open position against a thrust of said chucking spring; and
   wherein said driving means comprises in said rotatable spindle arrangement:
      a pneumatic chamber;
      primary and secondary hydraulic chambers; and
      communication passages within said spindle body for providing communication between said hydraulic chambers;
   and said driving means further comprises:
      feeding means for feeding said pneumatic chamber with pressurized pneumatic fluid, said feeding means comprising at least one fixed conduit through said frame, and an air passage of a predetermined clearance between said at least one conduit and said spindle arrangement.

2. A device as claimed in claim 1, wherein said driving means comprises a primary piston axially movable with respect to said spindle body, and said primary piston includes and active face which forms a wall face of said pneumatic chamber, said primary piston further comprising a prolongation of tubular shape which extends around said spindle body and which forms an outer cylindrical wall of said primary hydraulic chamber.

3. A device as claimed in claim 2, wherein said spindle body includes two cylindrical bearing surfaces of different diameters situated adjacent to one another, said primary piston includes two bores engaging and matching said cylindrical bearing surfaces, said primary hydraulic chamber being closed at each end and bounded by said prolongation of said primary piston, by said two bores and by said cylindrical surfaces of said spindle body.

4. A device as claimed in claim 3, wherein said spindle body further comprises a cylinder portion which extends around said active face of said primary piston.

5. A device as claimed in claim 1, wherein said driving means comprises a secondary piston integral with one of said socket and chuck members, a cylindrical part integral with said spindle body and surrounding said secondary piston and an annular rear wall integral with said cylindrical part, said secondary hydraulic chamber being bounded by said cylindrical part and said secondary piston, and said chucking spring being located between said rear wall and said secondary piston.

6. A device as claimed in claim 1, where said feeding means comprises a plurality of conduit passing radially through said frame, a circular groove in said frame into which said conduits open, a series of radial holes through said spindle body, and an annular duct extending axially into said spindle body and reaching said pneumatic chamber, said circular groove facing said holes for providing said predetermined clearance of the air passage.

* * * * *